(12) United States Patent
Heinzelmann et al.

(10) Patent No.: US 12,636,769 B2
(45) Date of Patent: *May 26, 2026

(54) CHAIN SAW OR CUTOFF MACHINE

(71) Applicant: Andreas Stihl AG & Co. KG, Waiblingen (DE)

(72) Inventors: Georg Heinzelmann, Winnenden (DE); Johann-Sebastian Renz, Gomaringen (DE); Marco Weber, Backnang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,340

(22) Filed: Jul. 8, 2024

(65) Prior Publication Data

US 2025/0018547 A1     Jan. 16, 2025

(30) Foreign Application Priority Data

Jul. 10, 2023 (DE) ...................... 10 2023 118 171.8
Jul. 10, 2023 (DE) ...................... 10 2023 118 179.3
Jul. 10, 2023 (DE) ...................... 10 2023 118 186.6

(51) Int. Cl.
B25F 5/00 (2006.01)
B27B 17/00 (2006.01)
H02K 7/14 (2006.01)

(52) U.S. Cl.
CPC ............. B25F 5/008 (2013.01); H02K 7/145 (2013.01); B27B 17/0008 (2013.01)

(58) Field of Classification Search
CPC ........ B25F 5/008; H02K 7/145; B27B 17/008
See application file for complete search history.

(56) References Cited

U.S. PATENT DOCUMENTS 5,168,837 A * 12/1992 Scholz ................... B27B 17/00
                                                              123/41.7
6,016,604 A     1/2000 Wolf et al.
7,311,067 B2 * 12/2007 Riehmann ............. B24B 55/052
                                                              123/41.7

(Continued)

FOREIGN PATENT DOCUMENTS

CN          107175724 A      9/2017
DE          196 31 033 A1    2/1998

(Continued)

*Primary Examiner* — Lucas E. A. Palmer
(74) *Attorney, Agent, or Firm* — Walter Ottesen, P.A.

(57) ABSTRACT

An apparatus has a tool having a tool plane and a handle. A longitudinal direction runs in the direction from the handle to the tool. An outer housing has an opening for cooling air. An electric motor is disposed in the housing and an air filter disposed on or in the opening. In a resting position on a horizontal plane, the base faces the plane. A cover lies opposite the base. A lateral surface interconnects cover and base. The outer housing, in a lateral view perpendicularly onto the tool plane, possesses a contour which in a projection onto the tool plane in the direction perpendicular to the tool plane delimits an imaginary housing surface. The filter in a projection onto the tool plane in the direction perpendicular to the tool plane possesses an outer contour delimiting an imaginary surface of at least 5% of the imaginary housing surface.

17 Claims, 7 Drawing Sheets

(56)                References Cited

U.S. PATENT DOCUMENTS

| | | | | |
|---|---|---|---|---|
| 7,699,902 | B2 * | 4/2010 | Ohsawa | F01P 11/12 |
| | | | | 30/59 |
| D636,652 | S * | 4/2011 | Mehra | D8/65 |
| D642,885 | S * | 8/2011 | Sugishita | D8/65 |
| 11,000,933 | B2 | 5/2021 | Ishikawa | |
| D937,647 | S * | 12/2021 | Kuang | D8/65 |
| 2003/0034004 | A1 | 2/2003 | Leipelt et al. | |
| 2010/0122683 | A1 * | 5/2010 | Kawana | F02B 63/02 |
| | | | | 123/195 C |
| 2012/0066916 | A1 | 3/2012 | Heinzelmann et al. | |
| 2015/0027745 | A1 * | 1/2015 | Kurzenberger | B25F 5/006 |
| | | | | 173/162.2 |
| 2017/0259452 | A1 * | 9/2017 | Kachi | B25F 5/008 |
| 2018/0222011 | A1 | 8/2018 | Eisenblaetter | |
| 2018/0319002 | A1 * | 11/2018 | Esenwein | B25F 5/02 |
| 2018/0326337 | A1 * | 11/2018 | Esenwein | B01D 46/0005 |
| 2019/0262753 | A1 * | 8/2019 | Miura | B25F 5/008 |
| 2020/0276694 | A1 * | 9/2020 | Esenwein | B25F 5/008 |
| 2021/0046632 | A1 * | 2/2021 | Osawa | B01D 46/0004 |
| 2021/0151814 | A1 | 5/2021 | Heinzelmann et al. | |
| 2023/0090978 | A1 * | 3/2023 | Arnell | B23D 45/16 |
| | | | | 408/67 |
| 2025/0018547 | A1 * | 1/2025 | Heinzelmann | B27B 17/00 |

FOREIGN PATENT DOCUMENTS

| | | | | | |
|---|---|---|---|---|---|
| DE | 199 51 408 | A1 | 5/2001 | | |
| DE | 10 2005 062 693 | A1 | 7/2007 | | |
| DE | 10 2015 225 748 | A1 | 6/2017 | | |
| DE | 10 2016 213 617 | A1 | 6/2017 | | |
| DE | 10 2017 001 002 | A1 | 8/2018 | | |
| DE | 202019104914 | U1 * | 9/2019 | | B25F 5/02 |
| DE | 102021134362 | A1 * | 6/2023 | | B25F 5/008 |
| EP | 2431132 | A2 * | 3/2012 | | B23Q 11/14 |
| EP | 2 829 363 | B1 | 2/2017 | | |
| EP | 2 747 949 | B1 | 11/2017 | | |
| EP | 2 431 132 | B1 | 7/2019 | | |
| EP | 3 389 940 | B1 | 1/2021 | | |
| EP | 3 778 132 | A1 | 2/2021 | | |
| EP | 3 778 133 | A1 | 2/2021 | | |
| EP | 3 815 848 | A1 | 5/2021 | | |
| EP | 3 825 065 | A1 | 5/2021 | | |
| EP | 3 389 941 | B1 | 4/2022 | | |
| EP | 4008477 | A1 * | 6/2022 | | B25F 5/008 |
| JP | 2016-007680 | A | 1/2016 | | |
| WO | 2019/061088 | A1 | 4/2019 | | |
| WO | 2020/223186 | A1 | 11/2020 | | |

* cited by examiner

139

145

CHAIN SAW OR CUTOFF MACHINE

CROSS-REFERENCE TO RELATED APPLICATIONS

This application claims priority of German patent application nos. 10 2023 118 171.8, filed Jul. 10, 2023, 10 2023 118 179.3, filed Jul. 10, 2023, and 10 2023 118 186.6, filed Jul. 10, 2023, the entire contents of which are incorporated herein by reference.

TECHNICAL FIELD

The disclosure relates to a chain saw or a cutoff machine having a tool having a tool plane and an operator-controlled handle, a longitudinal direction running in the direction from the operator-controlled handle to the tool. The work apparatus includes an outer housing having a housing opening for inducting cooling air into the outer housing; an electric motor which is disposed in the outer housing for driving the tool; and an air filter which is disposed on or in the housing opening. The chain saw or the cutoff machine in a resting position can be placed on a horizontal plane; the outer housing possessing a base which in the resting position faces the horizontal plane; the outer housing having a housing cover which lies opposite the base; the outer housing having a lateral surface which connects the housing cover and the base to one another and along the longitudinal direction delimits the work apparatus in the direction perpendicular to the tool plane.

The terms "chain saw" and "cutoff machine" are combined under the term "work apparatus" hereinbelow. "Work apparatus" thus accordingly denotes a chain saw or a cutoff machine.

BACKGROUND

In work apparatuses of this type, cooling air is guided into the outer housing for cooling the electric motor. The air filter is provided so that the electric motor is protected from dirt. After a certain period of use the air filter should be cleaned or replaced. Depending on the conditions of use, this period of use may be shorter or longer. The filter should then be cleaned or replaced at corresponding temporal intervals.

SUMMARY

It is an object of the disclosure to refine a chain saw or a cutoff machine in such a manner that the air filter has to be cleaned or replaced only after an ideally long period of use of the work apparatus.

This object is, for example, achieved by a chain saw or cutoff machine including: a tool defining a tool plane; an operator-controlled handle; the chain saw or cutoff machine defining a longitudinal direction running in a direction from the operator-controlled handle to the tool; an outer housing defining a housing opening for inducting cooling air into the outer housing; an electric motor disposed in the outer housing and configured to drive the tool; an air filter disposed on or in the housing opening; wherein the chain saw or the cutoff machine in a resting position is configured to be placed on a horizontal plane; the outer housing having a base which in the resting position faces the horizontal plane; the outer housing having a housing cover which lies opposite the base; the outer housing having a lateral surface which connects the housing cover and the base to one another and along the longitudinal direction delimits the chain saw or the cutoff machine in a direction perpendicular to the tool plane; the air filter being disposed on the lateral surface of the outer housing; the outer housing, in a lateral view perpendicularly onto the tool plane, having a housing outer contour which in an imaginary projection onto the tool plane in the direction perpendicular to the tool plane delimits an imaginary housing surface; the air filter in an imaginary projection onto the tool plane in the direction perpendicular to the tool plane having a filter outer contour which delimits an imaginary filter surface; and, the imaginary filter surface being at least 5% of the imaginary housing surface.

It is provided in various embodiments according to the disclosure that the air filter is disposed on the lateral surface of the outer housing. As a result, there is sufficient space available for the arrangement of the air filter. The air filter can be of a large configuration. The air filter can have a large filter surface. As a result, the same quantity of air can be filtered on a larger surface. Accordingly, the input of dirt per unit area for the air filter is less. As a result, the air filter has to be replaced only after a long period of use. Due to the air filter being disposed laterally on the lateral surface of the outer housing, the air filter is comfortably accessible.

The outer housing, in a lateral view perpendicularly onto the tool plane, possesses a housing outer contour. The housing outer contour in an imaginary projection onto the tool plane delimits an imaginary housing surface. The projection takes place in the direction perpendicular to the tool plane. The air filter in an imaginary projection onto the tool plane possesses a filter outer contour. The projection takes place in the direction perpendicular to the tool plane. The filter outer contour delimits an imaginary filter surface in the tool plane. The filter surface is at least 5%, in particular at least 10%, in particular at least 11%, in particular at least 15%, in particular at least 18%, of the housing surface.

As a result of the filter surface being at least 5%, in particular at least 10%, in particular at least 11%, in particular at least 15%, in particular at least 18%, of the housing surface, the filter surface is particularly large. As a result, inducted dirt can be distributed across a large surface, on the one hand, and the suction force is distributed across a larger surface, on the other hand. The distribution of the dirt across a larger surface increases the service life of the filter. If the same quantity of dirt can be distributed across a larger surface, the thickness of the dirt layer created herein is minor. As a result, the air filter can be replaced at larger intervals. Owing to the fact that the suction force can be distributed across a larger filter surface, the suction vacuum is minor, and in this way the suction velocity and the flow velocity of the inducted cooling air are also minor. This has the effect of a reduced entrainment of dirt. The number of particles entrained by the cooling air is proportional to the flow velocity of the cooling air squared. The number of entrained dirt particles is also reduced if the flow velocity is reduced. Due to the lower degree of contamination, the air filter has to be replaced only after a long period of use.

In an embodiment of the disclosure it is provided that the housing opening is disposed on the lateral surface of the outer housing. The housing opening in an imaginary projection onto the tool plane in the direction perpendicular to the tool plane possesses an opening outer contour. The opening outer contour delimits in the tool plane an imaginary opening area. The opening area is in particular at least 5%, in particular at least 10%, in particular at least 11%, of the housing surface. As a result, an air filter with a large filter surface can be used. The service life is increased and the entrainment of dirt reduced as a result.

The filter surface is in particular at least 60 cm², in particular at least 70 cm², in particular at least 80 cm², in particular at least 85 cm², in particular at least 100 cm², in particular at least 125 cm². Owing to the fact that the filter surface is so large, air is inducted into the work apparatus across a large surface. As a result, dirt which is inducted with the cooling air can be distributed across a larger surface. In particular, particles which are inducted with the cooling air can be distributed across a larger surface. The filter does not become clogged so rapidly as a result. The service life of the filter is increased by the large filter surface of the air filter.

According to various embodiments, it is provided that in the chain saw or the cutoff machine having a tool having a tool plane and an operator-controlled handle, a longitudinal direction runs in the direction from the operator-controlled handle to the tool. The chain saw or the cutoff machine includes an inlet opening for the entry of cooling air into the chain saw or into the cutoff machine, an outer housing, and an electric motor which is disposed in the outer housing for driving the tool. The chain saw or the cutoff machine includes an air filter for filtering the cooling air. The air filter is disposed exclusively on a first side of the tool plane. The inlet opening is disposed in such a way that cooling air can flow in the longitudinal direction through the inlet opening.

The outer housing in a lateral view perpendicular onto the first side of the tool plane possesses a housing outer contour. The housing outer contour in an imaginary projection onto the tool plane delimits in the tool plane an imaginary housing surface. The projection takes place in the direction perpendicular to the tool plane. According to the disclosure, the work apparatus in the lateral view perpendicular onto the first side of the tool plane within the housing outer contour is free from openings for the entry of cooling air into the work apparatus across at least 95%, in particular across at least 97%, in particular across at least 98.5%, of the imaginary housing surface.

The term "opening" in the lateral view perpendicular onto the first side of the tool plane describes only that part of a penetration opening for the entry of cooling air into the work apparatus that is visible in the lateral view perpendicular onto the first side of the tool plane. The penetration opening can in fact be larger than the opening, but in the lateral view perpendicular onto the first side of the tool plane is then obscured by a component of the work apparatus.

When the openings, thus in particular only that part of the penetration openings for the entry of cooling air into the work apparatus that is visible in the lateral view perpendicular onto the first side of the tool plane, are projected onto the tool plane in the direction perpendicular to the tool plane, the proportion of the surface in the housing surface that is free from projections of the opening is at least 95%, in particular at least 97%, in particular at least 98.5%, of the imaginary housing surface.

Owing to the fact that the work apparatus in the lateral view perpendicular onto the first side of the tool plane is largely free from openings for the entry of cooling air into the work apparatus, the air filter is well protected against invading dirt. In particular when the work apparatus is used in such a way that the inlet openings point upward in terms of the vertical, only little dirt, which falls onto the work apparatus due to gravity, for example, can enter through the inlet openings. In the case of the chain saw, this applies in particular when felling trees. Sawdust which is swirled around and descends when cutting with the chain saw, or other dirt, cannot enter the work apparatus through the inlet openings for the cooling air in the first place and make its way to the air filter.

Owing to the fact that the cooling air can flow in the longitudinal direction, thus in the direction from the back end to the front end of the work apparatus, from the outside through the inlet opening into the work apparatus, the inlet opening is positioned so as to be well protected against dirt which is created by the tool in the use of the handheld work apparatus or in any other way. As a result, the inlet opening points in particular away from the tool. In terms of the longitudinal direction, the inlet opening is disposed in particular in front of the tool, in particular disposed at a smaller spacing from the operator-controlled handle than from the tool. The inlet opening faces in particular away from the tool. Only little dirt makes its way into the work apparatus through the inlet opening for cooling air also as a result thereof. Only little dirt advances to the air filter. As a result, the air filter has to be replaced only after a long period of use.

It is expediently provided that the chain saw or the cutoff machine can be placed in a resting position on a horizontal plane; that the outer housing possesses a base which in the resting position faces the horizontal plane; that the outer housing has a housing cover which lies opposite the base; and that the outer housing has a lateral surface which connects the housing cover and the base to one another and along the longitudinal direction delimits the work apparatus in the direction perpendicular to the tool plane.

The air filter is in particular disposed on the lateral surface of the outer housing. The air filter in an imaginary projection onto the tool plane in the direction perpendicular to the tool plane possesses the filter outer contour which in the tool plane delimits the imaginary filter surface. The filter surface is in particular at least 5%, in particular at least 10%, in particular at least 11%, in particular at least 15%, in particular at least 18%, of the housing surface, and/or the filter surface is in particular at least 60 cm², in particular at least 70 cm², in particular at least 80 cm², in particular at least 85 cm², in particular at least 100 cm², in particular at least 125 cm².

In an embodiment of the disclosure, the inlet opening is visible when viewed in the longitudinal direction onto the work apparatus. In particular, the inlet opening is completely unobscured when viewed in the longitudinal direction onto the work apparatus. As a result, the work apparatus can particularly well attract cooling air through the inlet opening. Fresh cooling air can positively and reliably flow into the region in front of the inlet opening.

An upward direction extends in the direction transverse to the longitudinal direction, in particular in the direction perpendicular thereto. The upward direction extends parallel to the tool plane.

In an embodiment of the disclosure it is provided that the air filter is inclined in the upward direction in relation to the first lateral surface of the chain saw or of the cutoff machine in such a way that dirt can be released and fall out of the air filter due to gravity. In particular, the air filter is inclined at an angle of at least 5° toward the upward direction.

In an embodiment of the disclosure the work apparatus has a lower inlet opening for the entry of the cooling air into the work apparatus. The lower inlet opening is disposed in such a way that cooling air can flow in the upward direction through the lower inlet opening. An additional inlet opening for cooling air is provided by virtue of the lower inlet opening for the entry of cooling air into the work apparatus, so that an overall larger induction area is available. The large induction area ensures a low flow velocity and thus also a minor entrainment of dirt. The amount of dirt entrained by the cooling air drops with the flow velocity squared. The number of entrained particles of a sufficiently small, identical size and characteristic is proportional to the velocity of the cooling air squared. Owing to the fact that a lower inlet opening is provided, dirt which has been inducted through one of the openings for cooling air can fall out of the work apparatus through the lower inlet opening again due to gravity. The work apparatus is in particular conceived in such a way that dirt can be released from the air filter due to gravity, in particular in a resting position of the work apparatus, and can fall out of the work apparatus through the lower inlet opening. The air filter is not unnecessarily clogged as a result.

The inlet opening, which is disposed in such a way that cooling air can flow through the latter in the longitudinal direction, possesses a flow cross-sectional area. The lower inlet opening possesses a lower flow cross-sectional area. The flow cross-sectional area of the lower inlet opening is in particular 100% to 120% of the flow cross-sectional area of the inlet opening.

The work apparatus expediently has a filter cover for mounting the air filter. However, it can also be provided that the work apparatus is configured without a filter cover. In particular, the filter cover covers the air filter at least partially, in particular completely in the lateral view in the direction perpendicular onto the first side of the tool plane. The air filter is expediently held between the filter cover and the outer housing, in particular held in a clamped manner.

The air filter is in particular held with a clearance between the filter cover and a base body of the chain saw or of the cutoff machine. A simple production of the work apparatus is possible as a result. The filter cover can be pressed against the base body and rest on the base body, without having to take into consideration the air filter for this purpose in terms of the manufacturing tolerances. Owing to the fact that the filter cover can be pressed against the base body, minor requirements can be set in terms of the manufacturing tolerances relating to the relative position of the base body and the filter cover, and the filter cover can nevertheless rest on the base body in a reliably tight manner.

In an embodiment of the disclosure, the inlet opening of the work apparatus is formed in the filter cover. The lower inlet opening is expediently formed in the filter cover. As a result, the inlet opening, or the lower inlet opening, can be produced in a simple manner, respectively.

The filter cover and/or the air filter, in particular the external air filter, is expediently able to be fastened to the outer housing by a single fastening element. As a result, the filter cover can rest tightly, in particular in an air-tight manner, on the outer housing. The single fastening element is in particular a central fastening element. In particular, in the lateral view perpendicular onto the tool plane, the fastening element is able to be fastened approximately in the center of the filter cover, in particular in the center of the area of the surface assigned to the filter outer contour. As a result of the filter cover being able to be fastened by a single fastening element, the filter cover can be assembled and disassembled in a simple and comfortable manner. The air filter is rapidly replaceable and easily accessible.

The outer housing has in particular a housing opening for inducting cooling air into the outer housing. The air filter covers in particular the housing opening. The air filter is expediently disposed in the housing opening. However, it can also be provided that the air filter is disposed on or at the housing opening. The filter cover has a cover outer contour in the lateral view perpendicular onto the tool plane. The cover outer contour in an imaginary projection onto the tool plane delimits in the tool plane an imaginary cover surface. The imaginary projection takes place in the direction perpendicular to the tool plane. In a projection of the filter cover onto the tool plane in the direction perpendicular to the tool plane, this projection has an outer contour that corresponds to the cover outer contour. The cover outer contour in the tool plane delimits the imaginary cover surface. The filter cover in the lateral view perpendicular onto the tool plane, in particular within the cover outer contour, is in particular free from openings for the entry of cooling air into the work apparatus across at least 85%, in particular across at least 90%, in particular across at least 95%, of the cover surface.

The filter cover expediently has contact pressure ribs for pressing the air filter against the outer housing. The contact pressure ribs are in particular disposed in the region of the inlet opening and/or the lower inlet opening. The contact pressure ribs are in particular contiguous to the inlet opening and/or the lower inlet opening. The contact pressure ribs are expediently deeper in the flow direction of the cooling air in comparison to their width in the direction transverse to the flow direction of the cooling air. The filter cover is sufficiently supported on the outer housing by the contact pressure ribs. Owing to the fact that the contact pressure ribs are aligned in the flow direction of the cooling air, the contact pressure ribs represent a minor flow resistance for the cooling air. The contact pressure ribs block the entry of cooling air into the work apparatus, in particular into the outer housing, only to the minimum extent required in order to press the air filter against the outer housing via the contact pressure ribs.

In an embodiment of the disclosure, the outer housing has a receiving shaft for a rechargeable battery pack. The rechargeable battery pack is able to be inserted into the receiving shaft in an insertion direction through a receiving opening of the receiving shaft. The lateral surface is expediently free from the receiving opening of a receiving shaft for a rechargeable battery. The filter surface can be configured to be particularly large as a result. No space has to be provided for a receiving opening of a receiving shaft on the lateral surface. As a result, the opening area of the housing opening, in particular the housing opening, in particular the air filter, can be configured to be particularly large. The insertion direction runs in particular parallel to the tool plane.

It is expediently provided that an imaginary projection of the air filter onto the tool plane in the direction perpendicular to the tool plane, and an imaginary projection of the receiving shaft onto the tool plane in the direction perpendicular to the tool plane, overlap in the tool plane.

The air filter is expediently a fine filter. The air filter is in particular a flat filter. The air filter is in particular a fine dust filter.

The air filter includes in particular a filter frame and an air filter element. The air filter element is in particular held in the filter frame. The air filter element is the unit that per se effects the filtration of the air. The air filter can also consist exclusively of one air filter element. It can also be provided that the air filter does not include a filter frame. The air filter is also referred to as an air filter component.

The air filter has an actual surface. The actual surface is in particular a curved surface, in particular in the mathematical sense. The actual surface corresponds to the integrated area of one side of the surface of the air filter, in particular of the air filter element of the air filter. The actual surface is expediently larger than the filter surface projected onto the tool plane. This can be the case in both variants of the embodiments. In particular, the actual surface is at least 140%, in particular at least 160%, in particular at least 200%, of the filter surface projected onto the tool plane. As a result, the filtration effect can be good in a small space, in particular in the case of a small filter surface projected onto the tool plane. In particular, the air filter, in particular the air filter element, has folds. In particular, the air filter, in particular the air filter element, is a pleated filter.

In particular, the actual surface of the air filter is at least 150 cm², in particular 225 cm², in particular at least 275 cm².

In particular, the actual surface of the air filter is at least 8%, in particular at least 10%, in particular at least 15%, in particular at least 25%, in particular at least 30%, in particular at least 35%, in particular at least 38%, of the housing surface projected onto the tool plane.

The air filter forms in particular part of the outside of the work apparatus. The housing opening is advantageously formed as a depression in the first lateral surface of the outer housing in such a way that a cavity is formed between an outside of the first lateral surface and the air filter. A wall penetration opening is in particular formed in the housing opening. The wall penetration opening expediently completely penetrates a wall of the outer housing. In particular, the wall penetration opening completely penetrates the wall of the outer housing in a region of the wall that is covered by the air filter. Owing to the fact that the cavity is configured with a wall penetration opening, a configuration of the chain saw or of the cutoff machine is possible in such a manner that a positive filtration effect due to a large filter surface, and a positive cooling effect by virtue of a high flow velocity of the cooling air, are achieved at the same time.

The wall penetration opening possesses a penetration area. The penetration area is advantageously smaller than the filter surface. As a result, the flow velocity of the cooling air is increased on the way from the air filter to the penetration opening.

The cavity is in particular funnel-shaped. The air filter forms in particular an inlet opening for the cooling air into the cavity. The penetration opening forms in particular an outlet opening for the exit of the cooling air from the cavity. The penetration opening forms in particular an inlet opening for the entry of the cooling air into the interior of the outer housing. A configuration of the chain saw or of the cutoff machine that saves installation space is possible as a result. The first lateral surface of the outer housing, and the housing opening formed as a depression therein, can be utilized for tapering the flow cross section for the cooling air. No further components are required for this purpose.

The penetration area is in particular at most 30%, in particular at most 20%, of the filter surface. The penetration area is in particular at most 800 mm², in particular at most 600 mm², in particular at least 400 mm².

BRIEF DESCRIPTION OF DRAWINGS

The invention will now be described with reference to the drawings wherein.

DETAILED DESCRIPTION

Figure 1:
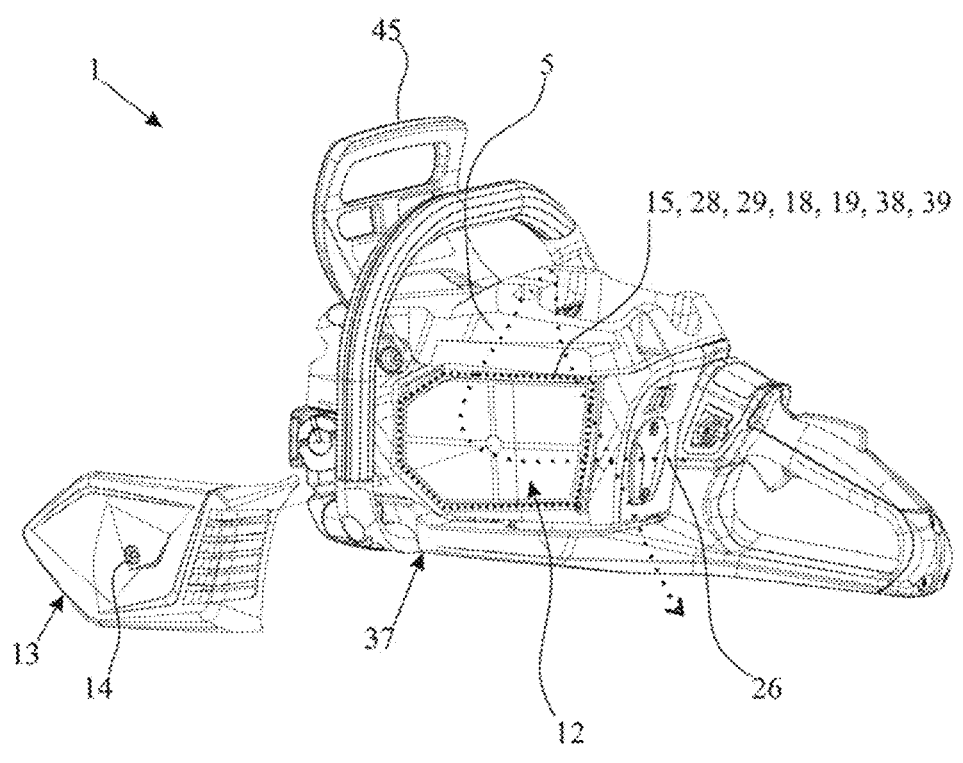
FIG. 1 shows a perspective illustration of a handheld work apparatus without tool, wherein the filter cover is illustrated in the manner of an exploded illustration, that is, so as to be removed from the outer housing.

FIG. 1 shows a handheld work apparatus 1. The handheld work apparatus 1 includes a tool 6 illustrated in FIG. 2. The tool 6 is not illustrated in FIG. 1. The handheld work apparatus 1 is either a chain saw or a cutoff machine. In the embodiment, the handheld work apparatus 1 is a chain saw. In the embodiment, the chain saw is a so-called rear-handle chain saw or tree-felling saw. However, this may also be a so-called top-handle chain saw or arboricultural saw. The handheld work apparatus 1 is portable in the intended use. The handheld work apparatus 1 is handheld in the intended use.

Figure 2:
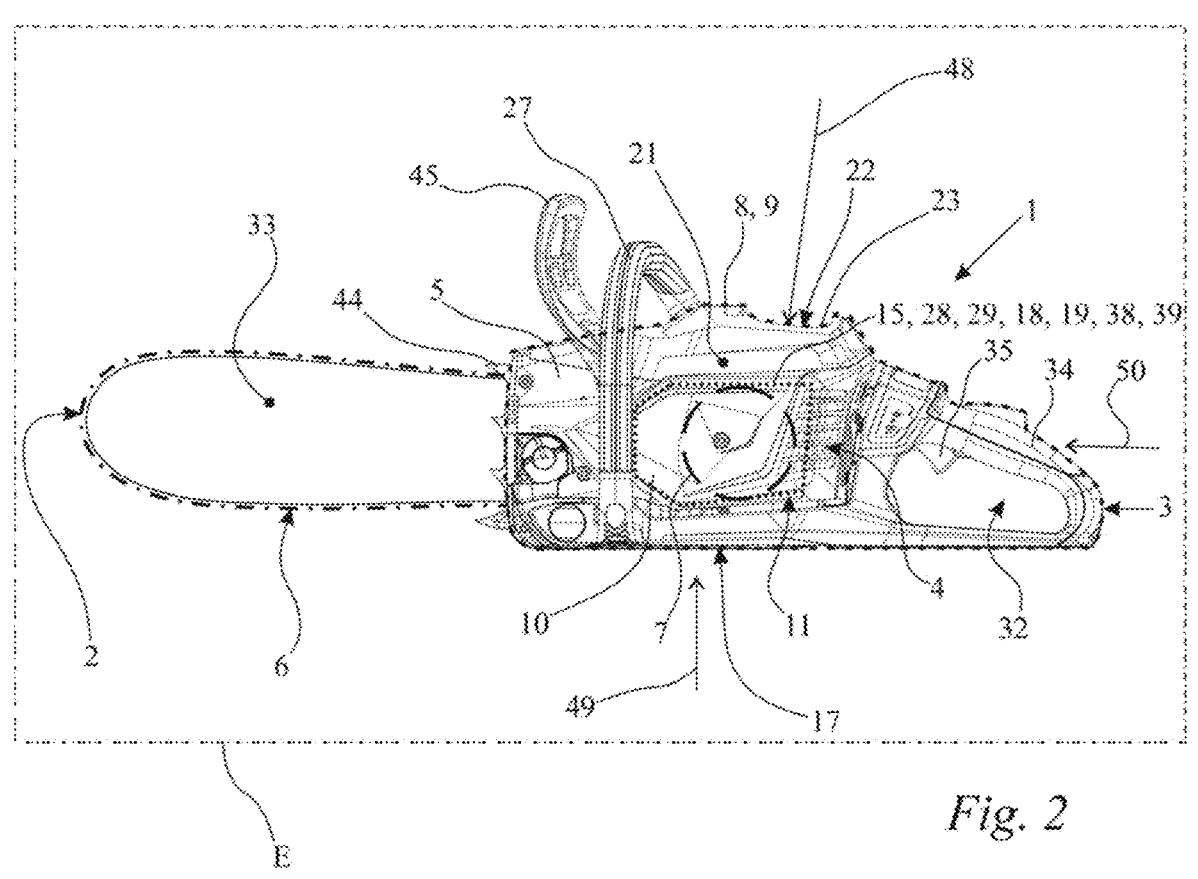
FIG. 2 shows a lateral view of the work apparatus from FIG. 1 with tool, viewed in the direction perpendicular onto the tool plane of the tool.

As is schematically illustrated in FIG. 2, the handheld work apparatus 1 includes a motor 7 for driving the tool 6. In the embodiment, the motor 7 is an electric motor. The tool 6 is a saw chain. However, it may also be provided that the tool 6 is a saw blade or a cutting disk. In the embodiment, the tool 6 revolves about a guide bar 33 during operation.

The work apparatus 1 includes an operator-controlled handle 34. An operator controlled element 35 is disposed on the operator-controlled handle 34. The operator can specify the output of the motor 7, or the rotating speed of the motor 7 or of the tool 6, via the operator controlled element 35. The operator-controlled handle 34 delimits a handle opening 32. The user can reach through the handle opening 32 with the fingers of his/her hand and enclose the operator-controlled handle 34 in this way. The handle opening 32 completely penetrates the work apparatus 1, in particular the outer housing 5. In addition to the operator-controlled handle 34, the work apparatus 1 includes a bale handle 27. The bale handle 27 serves to carry and guide the work apparatus 1.

The bale handle 27 is disposed between the operator-controlled handle 34 and the tool 6.

A longitudinal direction 50 extends in the direction from the operator-controlled handle 34 toward the tool 56. This also applies to an arboricultural saw. The longitudinal direction 50 runs parallel to a horizontal plane when the work apparatus 1 is placed on the horizontal plane. In the embodiments, the longitudinal direction 50 corresponds to the longitudinal direction of the guide bar 33. The work apparatus 1 includes a base 17 in all embodiments. The chain saw can lie on a horizontal plane by way of the base 17. A resting surface is formed by the base 17 in the embodiment. The longitudinal direction 50 runs parallel to the base 17. The bale handle 27 is disposed between the operator-controlled handle 34 and the tool 6 in terms of the longitudinal direction 50.

The work apparatus 1 possesses a front end 2 and a back end 3. The front end 2 faces away from the user during the operation of the work apparatus 1. The back end 3 faces the user during operation. In the embodiment, the front end 2 is located at the front end of the guide bar 33. The tool that revolves about the guide bar 33 forms the front end 2 of the work apparatus 1. The back end 3 is disposed at the back end of the operator-controlled handle 34. The operator-controlled handle 34 forms the back end 3 of the work apparatus 1. The longitudinal direction 50 runs in the direction from the rear end 3 to the front end 2. The longitudinal direction 50 points away from the operator when the work apparatus 1 is in use. The bale handle 27 is disposed between the front end 2 and the rear end 3 in terms of the longitudinal direction 50.

As is illustrated in FIG. 2, the work apparatus 1 includes an inlet opening 4. The inlet opening 4 serves as an entry for cooling air into the work apparatus 1. The cooling air is provided for cooling the motor 7 configured as an electric motor, in particular for cooling the electronic components of the electric motor. The work apparatus 1 includes an air filter 12 for filtering the cooling air. The air filter 12 is illustrated in FIG. 1. The air filter 12 in the embodiments includes a filter frame and an air filter element. The air filter element is in particular held in the filter frame. The air filter element is the unit that per se effects the filtration of the air. In the embodiments, the air filter element of the air filter 12 is a fine filter. The fine filter has a mesh size of less than 100 μm. In embodiments the air filter element of the air filter 12 is a flat filter. However, the air filter element of the air filter 12 may also be any other type of air filter element. The air filter 12 can also consist exclusively of one air filter element. It can also be provided that the air filter does not include a filter frame. The air filter 12 is also referred to as an air filter component.

The air filter 12 in the embodiment is a fine filter. The air filter 12 in the embodiment is a flat filter. The air filter 12 may however also be any other type of air filter. The work apparatus 1 includes an outer housing 5. The motor 7 is disposed in the outer housing 5. The outer housing 5 delimits the work apparatus 1 at least partially toward the outside.

As is illustrated in FIG. 2, the tool 6 possesses a tool plane E. The tool plane E runs parallel to the longitudinal direction 50. The longitudinal direction 50 runs parallel to the tool plane E. In the embodiment, the tool plane E runs perpendicularly to the base 17 of the work apparatus 1. The handle opening 32 completely penetrates the work apparatus 1, in particular the outer housing 5, in the direction perpendicular to the tool plane E. When placing the work apparatus 1 on a horizontal plane, the tool plane E runs perpendicularly to the horizontal plane. The tool 6 revolves in the tool plane E.

In the embodiment, the saw chain revolves in the tool plane E about the guide bar 33. If the work apparatus is configured as a cutoff machine, the circular saw blade rotates in the tool plane. The rotation axis of the tool 6 runs perpendicularly to the tool plane E.

As can be seen in FIG. 2, the inlet opening 4 is disposed in such a way that cooling air can flow in the longitudinal direction 50 through the inlet opening 4. The cooling air can thus enter the work apparatus 1 through the inlet opening 4 in the direction from the back end 3 of the work apparatus 1 toward the front end 2 of the handheld work apparatus 1. It can also be seen in FIG. 3 that the cooling air can flow in the longitudinal direction 50 through the inlet opening 4. The inlet openings 4 for the cooling air from the outside into the interior of the handheld work apparatus 1 are visible in a lateral view onto the back end 3.

Figures 3, 4:
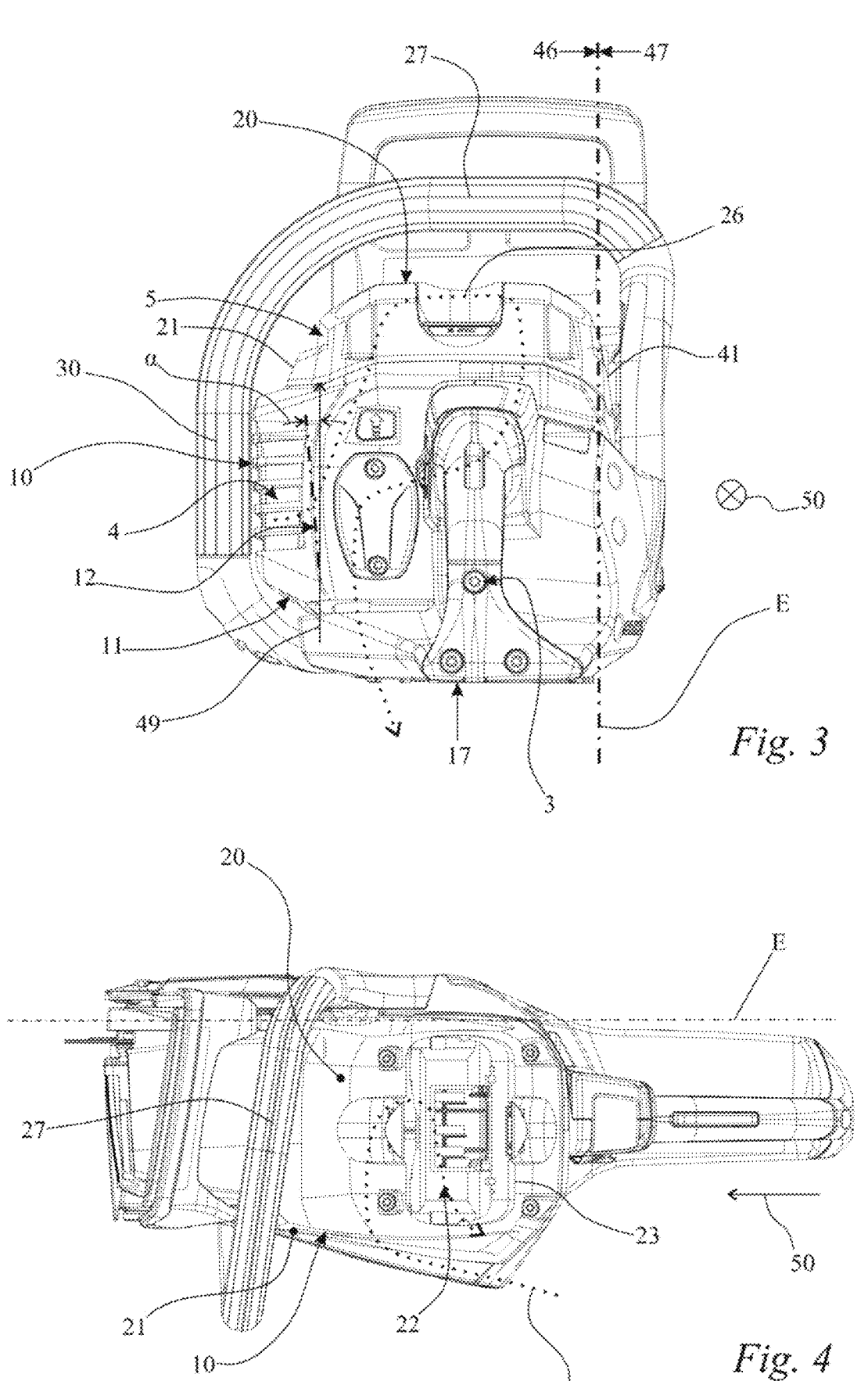
FIG. 3 shows a lateral view onto the back end of the work apparatus from FIG. 1, in the direction of its longitudinal direction.
FIG. 4 shows a plan view from above onto the work apparatus from FIG. 1.
Figure 5:
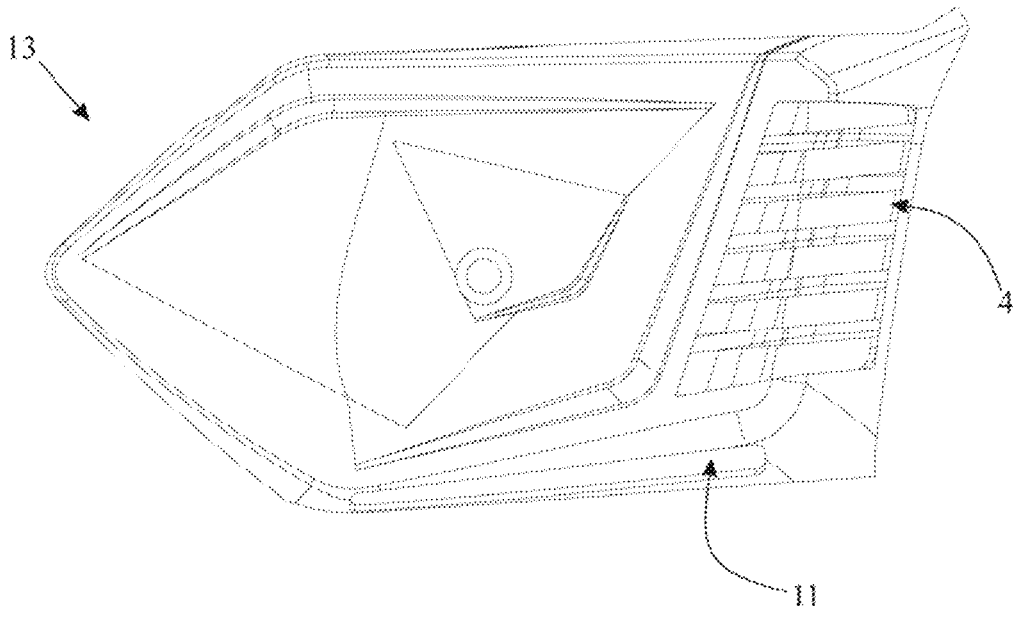
FIG. 5 shows a lateral view onto the outside of the filter cover of the work apparatus from FIG. 1.

The tool plane E possesses a first side 46 illustrated in FIG. 3. The tool plane E possesses a second side 47. The tool plane E separates the first side 46 from the second side 47. The air filter 12 is disposed completely on the first side 46 of the tool plane E.

As is illustrated in FIG. 2, the outer housing 5 in a lateral view perpendicular onto the tool plane E, in particular onto the first side 46 of the tool plane E, possesses a housing outer contour 8. In a projection of the housing outer contour 8 onto the tool plane E in the direction perpendicular onto the tool plane E, the housing outer contour 8 delimits in the tool plane E an imaginary housing surface 9. The housing outer contour 8 encloses all of the openings of the work apparatus 1 that lie within the housing outer contour 8. The housing outer contour 8 encloses in particular the handle opening 32. The housing surface 9 possesses no regions whatsoever that are enclosed by the housing surface 9 and do not belong to the housing surface 9. The housing surface 9 does not possess any internal contour. The housing surface 9 is delimited by a single boundary line, specifically the housing outer contour 8, that encloses the housing surface 9 in an encircling manner.

The work apparatus 1 includes a brake lever 45. The brake lever 45 is pivotably mounted on the outer housing 5. The brake lever 45 serves to decelerate the tool 6. The brake lever 45 lies partially outside the housing outer contour 8. The brake lever 45 projects beyond the housing outer contour 8.

The work apparatus 1 includes a clawed stop 44 illustrated in FIG. 2. The clawed stop 44 is fixedly established on the outer housing 5. The clawed stop 44 serves as a detent of the work apparatus 1 when the tool 6 engages in a workpiece. The clawed stop 44 lies at least partially outside the housing outer contour 8. The clawed stop 44 projects beyond the housing outer contour 8.

In the lateral view perpendicular onto the first side 46 of the tool plane E, the work apparatus 1 within the housing outer contour 8 is free from openings for the entry of cooling air into the work apparatus 1 across at least 95%, in particular across at least 97%, in particular across at least 98.5%, of the housing surface 9. The lateral view perpendicular onto the first side 46 of the tool plane E is that lateral view of the work apparatus 1 in which the view is in the direction perpendicular onto the tool plane E, specifically when viewed from the first side 46 of the tool plane E. The viewpoint is thus located on the first side 46 of the tool plane E, and the view is in the direction of the tool plane E.

A projection onto the tool plane E in the direction perpendicular onto the tool plane E of all of the openings for the entry of cooling air that are visible in a lateral view perpendicular onto the first side 46 of the tool plane E covers in the housing surface 9 a surface proportion of less than 5%, in particular of less than 3%, in particular of less than 1.5%, of the housing surface 9. That region of the housing surface 9 that is free from projections of the openings for the entry of cooling air into the work apparatus 1 is at least 95%, in particular at least 97%, in the embodiment at least 98.5%, of the housing surface 9.

The term "opening" describes that part of a penetration opening for the entry of cooling air into the work apparatus 1 that is visible in the lateral view in the direction perpendicular onto the first side 46 of the tool plane E. The penetration opening can be larger than the opening. In the lateral view in the direction perpendicular onto the first side 46 of the tool plane E, the penetration opening can be obscured by components of the work apparatus 1.

The inlet opening 4 is a penetration opening for the entry of cooling air into the work apparatus 1. The inlet opening 4 is disposed on the outside of the work apparatus 1. The inlet opening 4 represents the first inlet portal for the entry of cooling air from the outside into the work apparatus 1. The inlet opening 4 is an opening for the entry of cooling air into the work apparatus 1 in the above sense. In the embodiment, the projected area of the opening of the inlet opening 4 and of the penetration opening of the inlet opening 4 are identical. However, it may also be the case that the projected area of the penetration opening is larger than the projected area of the opening.

The housing outer contour 8 can also delimit the housing surface 9 in an imaginary plane running parallel to the tool plane E, instead of in the tool plane E.

As is illustrated in FIG. 2, the work apparatus 1 has an outer wall 10. In the embodiment, the inlet opening 4 completely penetrates the outer wall 10. A penetration opening completely penetrates the outer wall 10. An opening completely penetrates the outer wall 10. The outer wall 10 represents the direct boundary of the work apparatus 1 in relation to the external region. The outer wall 10 at least partially forms a wall of the outer housing 5. It can also be provided that the outer wall 10 is largely closed, and the cooling air can make its way, or be inducted, into the interior of the housing by way of smaller openings.

As is illustrated in particular in FIGS. 2 and 5 to 8, the work apparatus 1 has a lower inlet opening 11. The lower inlet opening 11 is provided for the entry of cooling air into the work apparatus 1. The lower inlet opening 11 is provided in addition to the inlet opening 4. The lower inlet opening 11 is disposed in such a way that cooling air can flow in an upward direction 49 through the lower inlet opening 11. The upward direction 49 extends in the direction transverse to the longitudinal direction 50. The upward direction 49 extends in the direction parallel to the tool plane E. In the embodiment, the upward direction 49 extends in the direction perpendicular to the longitudinal direction 50. When the work apparatus 1 is placed in a resting position provided therefor on a horizontal plane, the upward direction 49 in the embodiment extends perpendicularly to the horizontal area. In the embodiment, the upward direction 49 extends perpendicularly to the base 17. In the embodiment, the lower inlet opening 11 is formed separately from the inlet opening 4. However, it can also be provided that a single inlet opening is provided through which an entry of cooling air into the work apparatus 1 is possible in the longitudinal direction 50, as well as an entry of cooling air in the upward direction 49. In this case, the single inlet opening is divided into an inlet opening 4 and a lower inlet opening 11 only in an imaginary manner.

In the embodiment the work apparatus 1 includes a filter cover 13. The filter cover 13 is formed separately from a base body 37 of the work apparatus 1. The filter cover 13 is fastened to the base body 37. The outer housing 5 is the housing of the base body 37. In the embodiment, the air filter 12 is disposed between the base body 37 and the filter cover 13. In the embodiment, the air filter 12 is disposed between the outer housing 5 and the filter cover 13.

In the embodiment, the inlet opening 4 is formed in the filter cover 13. However, it can also be provided that the inlet opening 4 is formed in the outer housing 5 of the work apparatus 1. In the embodiment, the lower inlet opening 11 is formed in the filter cover 13. However, it can also be provided that the lower inlet opening 11 is formed in the outer housing 5 of the handheld work apparatus 1.

The filter cover 13 serves for mounting the air filter 12. As is illustrated in FIG. 1, for example, the filter cover 13 is able to be fastened to the outer housing 5 of the work apparatus 1 by a single fastening element 14. The filter cover 13 is in particular able to be fastened to the outer housing 5 by a single central fastening element 14. As is illustrated in FIG. 2, in the lateral view onto the work apparatus 1 in the direction perpendicular to the tool plane E, the fastening element 14 is disposed approximately in the center of the filter cover 13. In this lateral view the fastening element 14 is disposed approximately in the region of the center of the area of the filter cover 13. It can also be provided that the fastening element 14 is disposed exactly in the center of the area of the filter cover 13. The fastening element 14 in the embodiment is a screw. The fastening element 14 can be screwed through the filter cover 13 into the base body 37. The screw direction runs in the direction transverse, in particular in the direction perpendicular, to the tool plane E.

The air filter 12 is disposed between the filter cover 13 and the outer housing 5. The air filter 12 is jammed between the filter cover 13 and the outer housing 5. The air filter 12 is held with a clearance between the filter cover 13 and the base body 37 of the work apparatus 1. The fastening element 14 fastens the filter cover 13 to the base body 37 in such a manner that a holding space is formed between the filter cover 13 and the base body 37. The air filter 12 is held in the holding space. The air filter 12 has the clearance in the direction transverse to the longitudinal direction 50. The air filter 12 has the clearance in the direction transverse, in particular in the direction perpendicular, to the tool plane E.

A space which already belongs to the interior of the work apparatus 1 is formed between the filter cover 13 and the outer housing 5. Cooling air can enter the work apparatus 1, in particular the space between the filter cover 13 and the outer housing 5, through the inlet opening 4 and/or the lower inlet opening 11. The filter cover 13 delimits the work apparatus 1 toward the outside. The filter cover 13 serves to cover the air filter 12. The filter cover 13 possesses a cover which forms an outer lateral face of the work apparatus 1. The cover delimits the filter cover 13 in the direction transverse, in particular perpendicular, to the tool plane E. The cover is free from openings for the entry of cooling air into the work apparatus 1. The filter cover 13 possesses lateral walls. The lateral walls and the cover delimit the space between the filter cover 13 and the outer housing. The inlet opening 4 is disposed in a lateral wall. The lower inlet opening 11 is disposed in a lateral wall. The cover of the filter cover 13 is supported on the outer housing 5 by way of the lateral walls.

Figure 7:
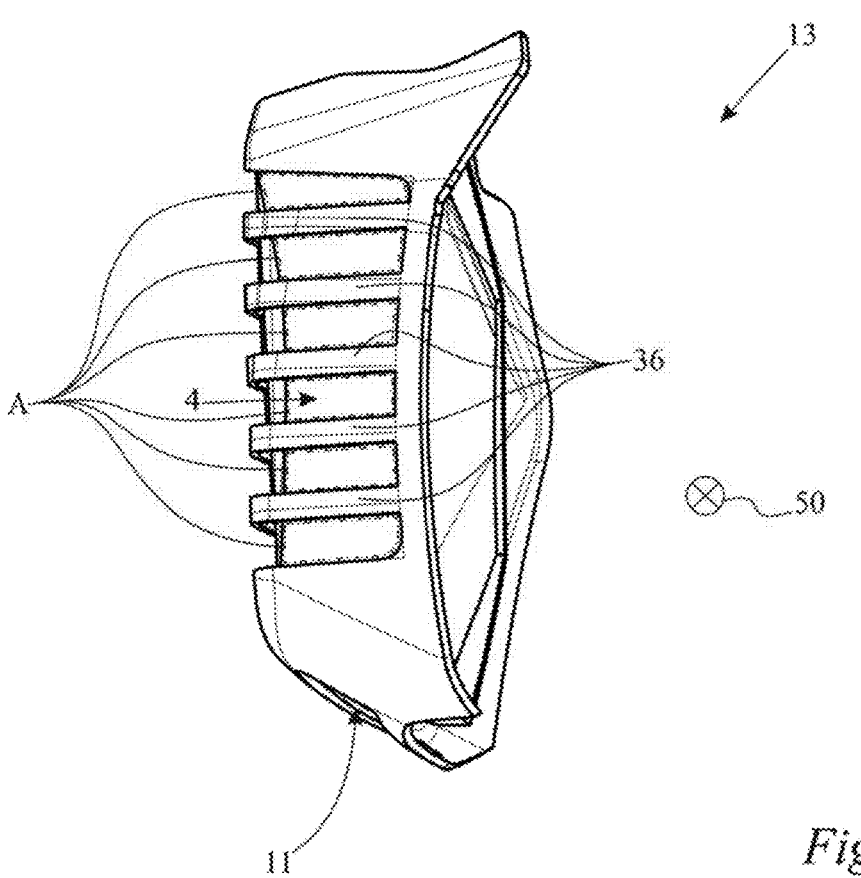
FIG. 7 shows a lateral view onto the rear side of the filter cover from FIG. 5, which in the assembled state on the handheld work apparatus faces away from the tool of the work apparatus.

As is illustrated in FIG. 7, the inlet opening 4 possesses a flow cross-sectional area A. The flow cross-sectional area A is composed of a plurality of sub-areas. Struts 36 of the filter cover 13 are disposed between the plurality of sub-areas.

Figure 8:
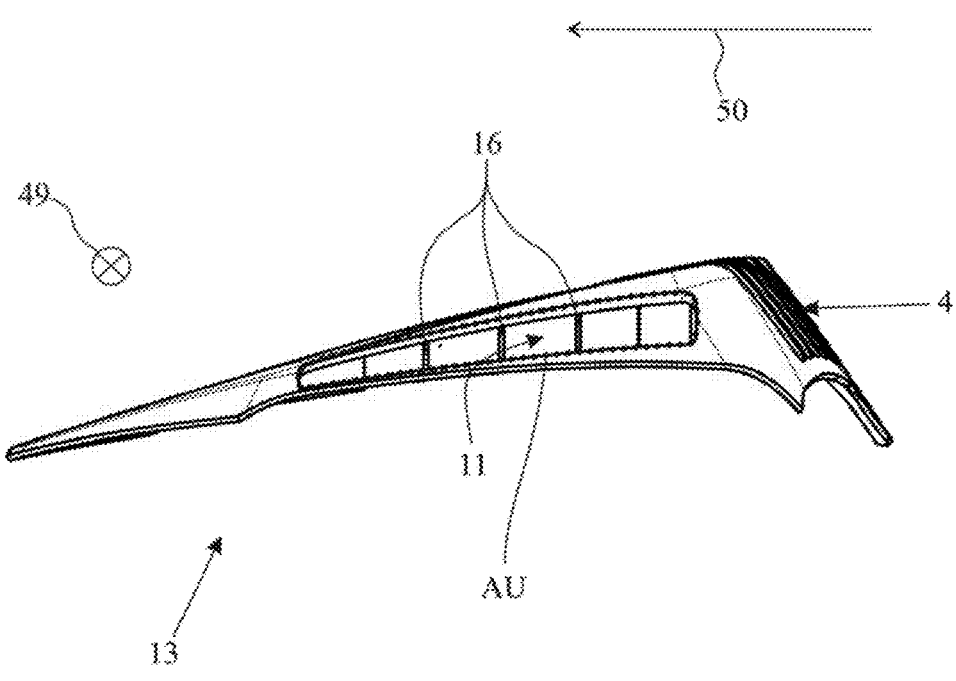
FIG. 8 shows a plan view from below onto the filter cover from FIG. 5, that is, onto the base of the work apparatus which in the assembled state of the filter cover points toward the horizontal plane when the work apparatus is placed on its resting surface on a horizontal plane.

As is illustrated in FIG. 8, the lower inlet opening 11, as opposed to the inlet opening 4, is disposed on a side of the work apparatus 1, or of the filter cover 13, that lies at the bottom in terms of the upward direction 49. The inlet openings 4 are disposed on a side of the work apparatus 1, or of the filter cover 13, that points toward the rear in terms of the longitudinal direction 50. The lower side of the filter cover 13 delimits the filter cover in the direction counter to the upward direction 49. The rear side of the filter cover 13 delimits the filter cover 13 in the direction counter to the longitudinal direction 50. The inlet opening 4 is disposed in the rear side of the filter cover 13. The lower inlet opening 11 is disposed in the lower side of the filter cover 13.

As is illustrated in FIG. 8, the lower inlet opening 11 possesses a lower flow cross-sectional area AU. In the embodiment, the lower flow cross-sectional area AU is of contiguous configuration. It can however also be provided that the lower flow cross-sectional area AU is composed of a plurality of flow cross-sectional sub-areas. In the embodiment, the lower flow cross-sectional area AU is 100% to 120% of the flow cross-sectional area A. The flow cross-sectional areas A and AU are measured transversely to the opening areas of the inlet opening 4 and of the lower inlet opening 11.

As is illustrated in FIG. 1, the outer housing 5 has a housing opening 15. The housing opening 15 completely penetrates the outer wall 10 of the outer housing 5. The housing opening 15 serves to induct cooling air into the outer housing 5. The air filter 12 is disposed in the housing opening 15. In the embodiment, the air filter 12 is disposed on the housing opening 15. The filter cover 13 at least partially covers the housing opening 15. It can also be provided that a depression in the outer housing 5, in particular in the outer wall 10, is provided instead of the housing opening 15 which completely penetrates the outer wall 10. In this instance, the in particular encircling periphery of this depression forms the location on which the air filter 12 rests. In this instance, a smaller housing opening through which the cooling air enters the interior of the outer housing 5 is provided in the depression.

In the lateral view perpendicular onto the first side 46 of the tool plane E, the filter cover 13 has a cover outer contour 18 as is illustrated in FIG. 2, for example. In an imaginary lateral view perpendicular onto the tool plane E, the cover outer contour 18 completely encloses the housing opening 15. In the projection of the cover outer contour 18 onto the tool plane E in the direction perpendicular to the tool plane E, the cover outer contour 18 delimits in the tool plane E an imaginary cover surface 19. The filter cover 13, in the lateral view perpendicular onto the first side 46 of the tool plane E, within the cover outer contour 18 is free from openings for the entry of cooling air into the work apparatus 1 across at least 85%, in particular across at least 90%, in the embodiment across at least 95%, of the cover surface 19. An imaginary projection of the filter cover 13 onto the tool plane E in the direction perpendicular to the tool plane E, within the cover outer contour projected in the same way onto the tool plane E, is free from openings for the entry of cooling air into the work apparatus 1 across at least 85%, in particular across at least 80%, in the embodiment across at least 95%, of the cover surface 19. The term "opening" is also to be understood as defined above in the context of the filter cover 13. This here is the proportion of a penetration opening that is visible when viewed perpendicularly onto the first side 46 of the tool plane E.

Figure 9:
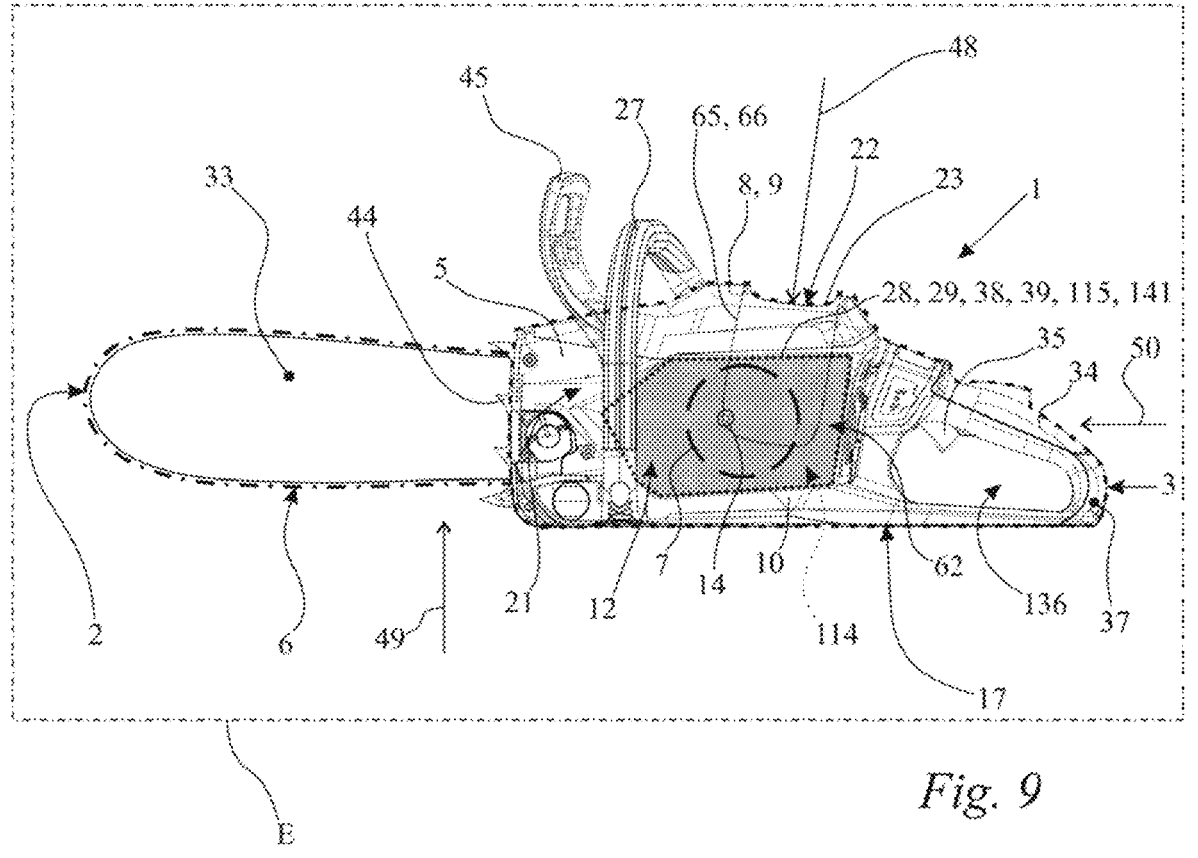
FIG. 9 shows a schematic lateral view onto an alternative embodiment of the work apparatus from FIG. 1, in which the air filter lies open on the first lateral surface, without being covered by a filter cover, wherein the work apparatus is illustrated with tool and viewed in the direction perpendicular onto the first side of the tool plane of the tool, on which the air filter is also disposed.

The air filter 12, in an imaginary projection onto the tool plane E in the direction perpendicular to the tool plane E, has a filter outer contour 38 as is illustrated in FIG. 2 or in FIG. 9. The filter outer contour 38 delimits in the tool plane E an imaginary filter surface 39. The filter surface 39 is at least 60 cm$^2$, in particular at least 70 cm$^2$, in particular at least 80 cm$^2$, in particular at least 85 cm$^2$, in particular at least 100 cm$^2$, in particular at least 125 cm$^2$. In the embodiment, the filter surface 39 is at most 100 cm$^2$, in particular at most 90 cm$^2$.

While the cover surface 19 and the filter surface 39 are schematically plotted with the same dashed line in FIG. 2, the cover surface 19 is however actually larger than the filter surface 39. The cover surface 19 is at least 101%, in particular at least 110%, in the embodiment at least 120%, of the filter surface 39. The cover surface 19 is at most 160%, in particular at most 150%, in the embodiment at most 140%, of the filter surface 39.

Figure 6:
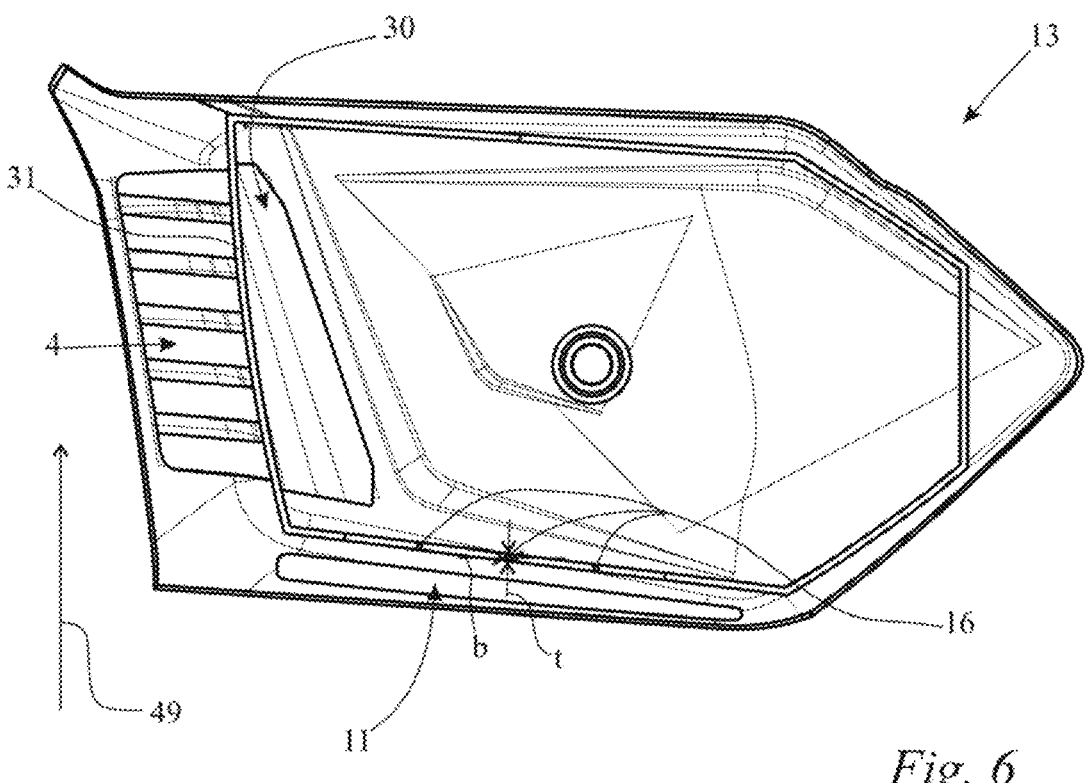
FIG. 6 shows a lateral view onto the inside of the filter cover of the work apparatus from FIG. 1.

As is illustrated in FIG. 6, the filter cover 13 has contact pressure ribs 16 for pressing the air filter 12 against the outer housing 5. The contact pressure ribs 16, proceeding from the cover of the filter cover 13, extend in the direction toward the base body 37. The contact pressure ribs 16 press the air filter 12 against the base body 37. The contact pressure ribs 16 run in the direction transverse to the tool plane E. The contact pressure ribs 16 penetrate the space between the filter cover 13 and the base body 37. The contact pressure ribs 16 in the embodiment are disposed in the region of the lower inlet opening 11. The contact pressure ribs 16 can however also be disposed in the region of the inlet opening 4. The contact pressure ribs 16 are disposed in the region of the periphery of the air filter 12.

The contact pressure ribs 16 are deeper in the flow direction of the cooling air in comparison to their width in the direction transverse to the flow direction. The contact pressure ribs 16 which in the embodiment are disposed in the region of the lower inlet opening 4 possess a width b, measured in the longitudinal direction 50, and a depth t, measured in the upward direction 49 (FIG. 6). The depth t is greater than the width b. The depth t is at least 150% of the width b. Cooling air, which has entered through the lower inlet opening 11, can advance to the air filter 12 between the contact pressure ribs 16, and advance into the outer housing 5 through the housing opening 15. A closed contact pressure strip 31 is disposed in the region of the inlet opening 4 in the embodiment. The contact pressure strip 31 presses the air filter 12 against the outer housing 5. An air passage opening 30 is provided in the filter cover 13 above the contact pressure strip 31. Cooling air can invade the filter cover 13 through the inlet opening 4, and can be directed onward through the air passage opening to the air filter 12, and through the housing opening 15 into the outer housing 5.

As is illustrated in FIG. 3, the work apparatus 1 in a resting position can be placed on a horizontal plane. The base 17 of the outer housing 5 faces the horizontal plane in the resting position. The outer housing 5 has a housing cover 20 which lies opposite the base 17. The housing cover 20 delimits the outer housing 5 of the work apparatus 1 in particular in the upward direction 49. The base 17 delimits the outer housing 5 of the work apparatus 1 in particular in the direction counter to the upward direction 49. The outer housing 5 has a first lateral surface 21. The first lateral surface 21 connects the housing cover 20 to the resting surface 17. The outer housing 5 of the work apparatus 1 has a second lateral surface 41. The second lateral surface 41 connects the housing cover 20 to the resting surface 17. The first lateral surface 21 lies opposite the second lateral surface 41. The first lateral surface 21 delimits the outer housing 5 in the direction perpendicular to the tool plane E on the first side 46 of the tool plane E. The second lateral surface 41 delimits the outer housing 5 of the work apparatus 1 on the second side 47 of the tool plane E. The first lateral surface 21 extends in the longitudinal direction 50. The first lateral surface 21 extends between the housing cover 20 and the base 17. The air filter 12 is disposed on the first lateral surface 21 of the outer housing 5. The housing opening 15 is disposed in or on the first lateral surface 21. The housing opening 15 in the embodiment completely penetrates the first lateral surface 21. However, it can also be provided that the housing opening 15 is only a depression in the outer housing 5. The air filter 12 is disposed in or on the housing opening 15. The imaginary filter surface 39 illustrated in FIG. 2 is at least 5%, in particular at least 10%, in particular at least 15%, in the embodiment less than 30%, in particular less than 20%, in particular less than 15%, of the housing surface 9.

The air filter 12 rests on the periphery of the housing opening 15. The housing opening is defined by that region in which the air filter 12 does not rest on the housing outer wall 10. In this region, the air filter 12 is a continuation of the housing outer wall 10 so to speak. As is illustrated in FIG. 2, the housing opening 15 in an imaginary projection onto the tool plane E in the direction perpendicular to the tool plane E possesses an opening outer contour 28. The opening outer contour 28 delimits an imaginary opening area 29. The opening area 29 extends in the tool plane E. The opening area 29 and the cover surface 19 in FIG. 2 are schematically plotted with the same dashed line. In fact, the cover surface 19 is larger than the opening area 29. The opening area 29 is at least 5%, in particular at least 10%, in the embodiment at least 11%, of the housing surface 9.

The opening area 29, in particular the filter surface 39, is at least 60 cm², in particular at least 70 cm², in particular at least 80 cm², in particular at least 85 cm², in particular at least 100 cm², in particular at least 125 cm², in the embodiment at most 100 cm², in particular at most 90 cm². The areas/surfaces are measured in the projection into the tool plane E. These areas/surfaces are in particular measured in the lateral view perpendicular onto the tool plane E.

The air filter 12 has an actual surface. In particular, the actual surface is a curved surface, in particular in the mathematical sense. The actual surface corresponds to the integrated area of one side of the surface of the air filter 12, in particular of the air filter element of the air filter 12. The actual surface is expediently larger than the filter surface 39 projected onto the tool plane E. In particular, the actual surface is at least 140%, in particular at least 160%, in particular at least 200%, of the filter surface 39 projected onto the tool plane. As a result, the filtration effect can be positive on a small space, in particular in a small filter surface 39 projected onto the tool plane. In particular, the air filter 12, in particular the air filter element, has folds. In particular, the air filter 12, in particular the air filter element, is a pleated filter.

In particular, the actual surface of the air filter is at least 150 cm², in particular 225 cm², in particular at least 275 cm².

The actual surface of the air filter 12 is in particular at least 8%, in particular at least 10%, in particular at least 15%, in particular at least 25%, in particular at least 30%, in particular at least 35%, in particular at least 38%, of the housing surface 9 projected onto the tool plane E.

The actual surface of the air filter 12 can be configured as described above for all embodiments.

As is schematically illustrated in FIG. 3, the air filter 12 in the upward direction 49 is inclined toward the first lateral surface 21 of the work apparatus 1 in such a way that dirt can be released from the air filter 12 and fall out due to gravity. The air filter 12 is inclined away from the tool plane E in the upward direction 49. The work apparatus 1 is conceived in such a way that dirt released from the air filter 12 and falling down due to gravity can fall out of the work apparatus 1 through the lower inlet opening 11. The lower inlet opening 11 serves as an exit for dirt. In the embodiment, the air filter 12 is inclined at an angle $\alpha$ of at least 5° toward the upward direction 49. The air filter 12 in the embodiment extends substantially in one plane.

As can be seen in FIG. 3, the inlet opening 4 is visible, in particular completely visible, in the view onto the back end 3 of the work apparatus 1 in the longitudinal direction 50. In the embodiment, the inlet opening 4 is unobscured, in particular completely unobscured, in the view onto the back end 3 of the work apparatus 1 in the longitudinal direction 50.

In the embodiment, a rechargeable battery pack is provided for supplying energy to the motor 7 configured as an electric motor. The handheld work apparatus 1 is a rechargeable battery-operated work apparatus. As is illustrated in FIGS. 2 and 4 for example, the outer housing 5 has a receiving shaft 22 for the rechargeable battery pack. The receiving shaft 22 possesses a receiving opening 23. The rechargeable battery pack is able to be inserted into the receiving shaft 22 through the receiving opening 23. The rechargeable battery pack is able to be inserted into the receiving shaft 22 in an insertion direction 48. As can be seen from FIGS. 2 to 4, the first lateral surface 21 is free from the receiving opening 23 of the receiving shaft 22 for the rechargeable battery pack. The receiving opening 23 of the receiving shaft 22 for the rechargeable battery pack extends exclusively in the housing cover 20 of the outer housing 5. The insertion direction 48 runs parallel to the tool plane E. The receiving opening 23 encloses the insertion direction 48 in an encircling manner. When the rechargeable battery pack is inserted into the receiving shaft 22, the rechargeable battery pack is introduced into the receiving shaft 22 through the receiving opening 23 toward the bottom, substantially counter to the upward direction 49.

An imaginary projection of the air filter 12 onto the tool plane E in the direction perpendicular to the tool plane E, and an imaginary projection of the receiving shaft 22 onto the tool plane E in the direction perpendicular to the tool plane E, overlap in the tool plane E. The receiving shaft 22 and the air filter 12 lie behind one another, in particular at a mutual spacing, in terms of a direction transverse, in particular perpendicular, to the tool plane E.

The cooling air is inducted into the work apparatus 1 by a fan (not illustrated in the figures) of the work apparatus 1 and guided along a flow path 26. The flow path 26 is schematically plotted by dashed lines in FIGS. 1, 3 and 4. The cooling air enters the work apparatus 1 through the inlet opening 4. It is additionally provided in the embodiment that cooling air can enter through the lower inlet opening 11. The cooling air flows in the direction of the longitudinal direction 50 through the inlet opening 4. The cooling air enters through the inlet opening 4, initially entering the space between the filter cover 13 and the air filter 12. The cooling air subsequently flows through the air filter 12 and the housing opening 15 disposed behind the latter. In the process, the cooling air in the embodiment flows into the interior of the outer housing 5 in the direction transverse to the tool plane E. It can also be provided that the cooling air when passing through the housing opening 15 initially enters only a depression of the outer housing 5 and only subsequently advances into the interior of the outer housing 5 through a further opening. This is the case in the embodiment according to FIGS. 9 to 12. In the embodiment according to FIGS. 1 to 8, the cooling air flows into the interior of the outer housing 5 in the direction transverse to the longitudinal direction 50. The cooling air enters the outer housing 5 of the work apparatus 1 through the housing opening 15. In the interior of the outer housing 5, the cooling air then flows along the flow path 26 in the upward direction 49 and to the electronics of the motor 7 configured as an electric motor. The electronics of the electric motor are cooled in the process. Thereafter, the cooling air flows counter to the upward direction 49 to the motor 7 configured as an electric motor. The cooling air leaves the work apparatus 1 through an opening in the base 17.

By virtue of the air filter being disposed on the first lateral surface 21, the filter surface 39 can be of a very large configuration. Moreover, the air filter 12 is easily accessible as a result, and can be replaced in a simple and comfortable manner. Owing to the fact that the cooling air enters the work apparatus 1 in the longitudinal direction 50 through the inlet opening 4, the inlet opening 4 can be configured in such a way that an effective area of the inlet opening 4, which points in the direction perpendicular to the tool plane E and is referred to above as opening, is small. As a result, the inlet opening 4 can even be configured in such a way that this effective area is zero. As a result, the dirt which would make its way into the work apparatus 1 in the direction perpendicular to the tool plane E cannot, or only to a minor extent, enter the work apparatus 1 through the inlet opening 4. This is of great advantage in particular when felling a tree with the work apparatus 1 configured as a chain saw.

FIGS. 9 to 12 show an alternative embodiment in which it is provided, in contrast to the embodiments according to FIGS. 1 to 8, that the cooling air enters the work apparatus 1 substantially in the direction transverse, in particular in the direction perpendicular, to the longitudinal direction 50. In the embodiment according to FIG. 9, the cooling air enters the work apparatus 1 in the direction transverse, in particular in the direction perpendicular, to the tool plane E. In the embodiment according to FIG. 9, a lateral inlet opening 62 for the entry of cooling air into the work apparatus 1 is provided. In the embodiment according to FIG. 9, the air filter 12 forms part of the outside of the work apparatus 1. Otherwise, the above description pertaining to FIGS. 1 to 8, in particular to FIGS. 1 to 4, also applies to the embodiments according to FIGS. 9 to 12. Equivalent components are provided with the same reference signs.

Figures 10, 11:
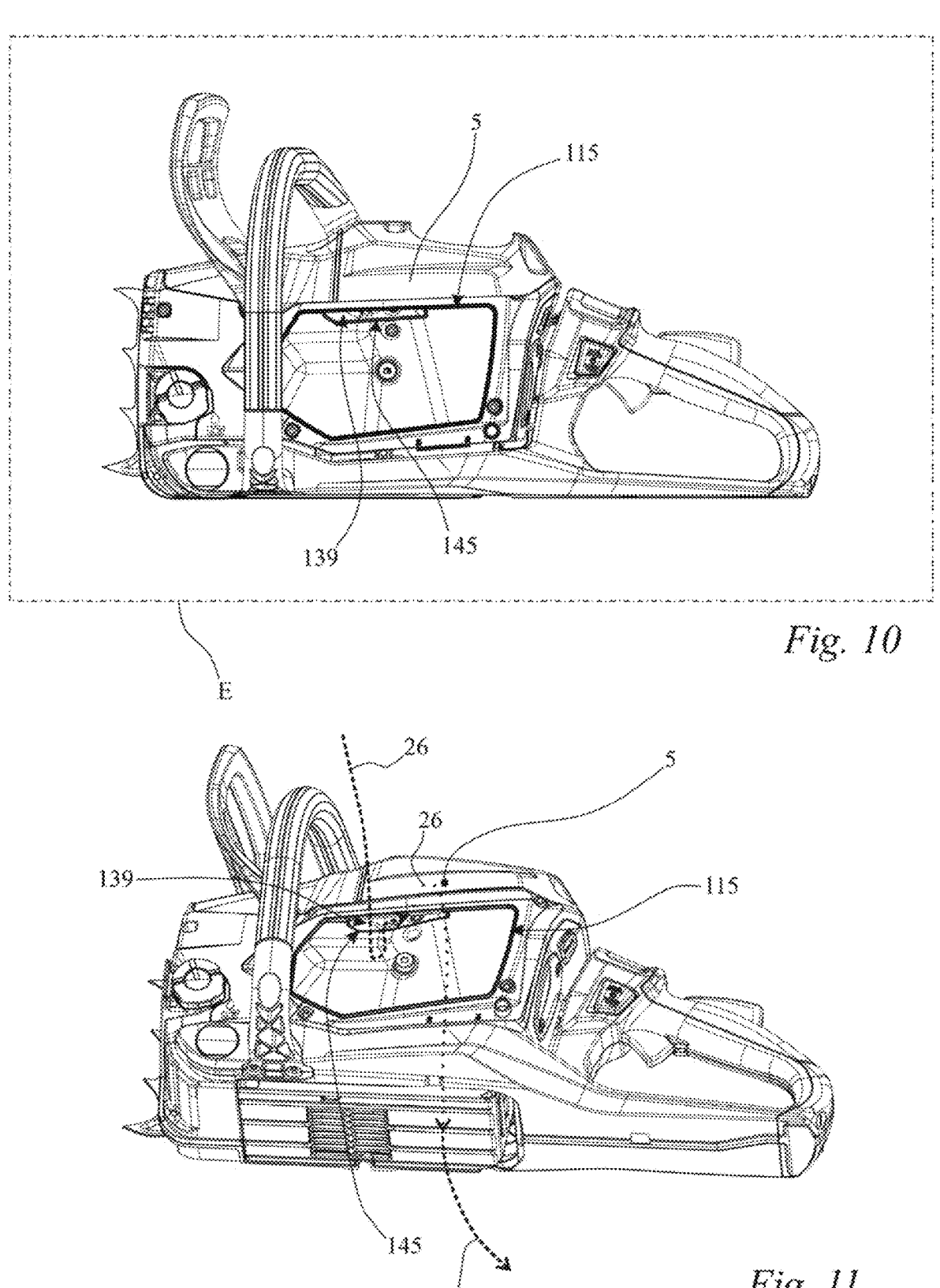
FIG. 10 shows a schematic lateral view onto the work apparatus according to FIG. 9, with a disassembled air filter, when viewed in the direction perpendicular onto the first side of the tool plane of the tool not illustrated, on which the air filter is also to be disposed.
FIG. 11 shows a schematic perspective view from below onto the work apparatus from FIG. 10, with a disassembled air filter, in which a penetration opening into a housing interior of an outer housing is visible; and, FIG. 12 shows a detail of a perspective view from below onto the work apparatus from FIG. 10, with a disassembled air filter, in which the penetration opening into the housing interior of the outer housing is visible.

When inducting cooling air into the interior of the work apparatus 1 according to FIGS. 9 to 12 by a fan not illustrated, in particular by an impeller not illustrated, the cooling air enters the work apparatus 1 directly through the air filter 12. The cooling air follows the flow path 26 (FIG. 11).

In the alternative embodiment according to FIGS. 9 to 12 it is provided that the outer housing 5 has a housing opening 115 which is configured as a depression in the first lateral surface 21. The air filter 12 is disposed in, at or on the housing opening 115 configured as a depression. The housing opening 115 does not completely penetrate the wall of the outer housing 5. In the embodiment, the air filter 12 is a continuation of the surface contour formed by the outer housing 5. The housing opening 115 is a recess. The housing opening 115 forms a cavity which is delimited by the air filter 12. After entering the work apparatus 1 through the air filter 12, the cooling air flows into the cavity before flowing into the interior of the outer housing 5. A cavity is formed by the housing opening 115 between the outer housing 5 and the air filter 12. The housing opening 115 possesses a periphery on which the air filter 12 rests. The housing opening 115 is also referred to as a lateral depression of the outer housing.

Figure 12:
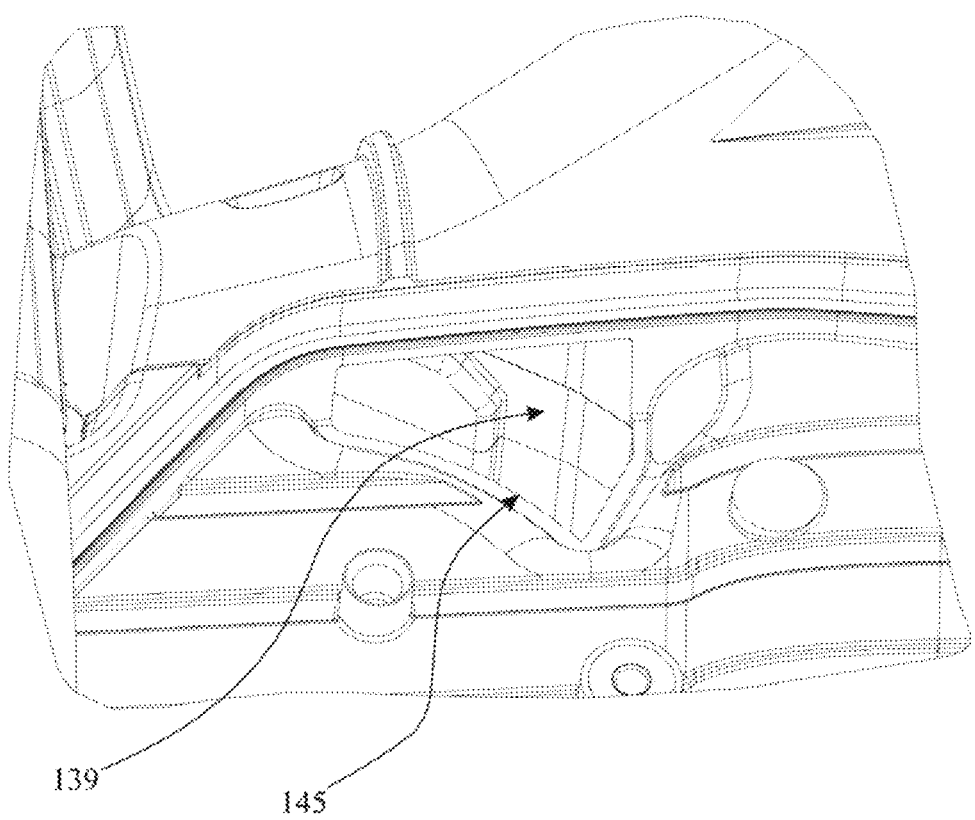

The outer housing 5 possesses a wall penetration opening 145 which is illustrated in FIGS. 10 to 12. The wall penetration opening 145 completely penetrates a wall of the outer housing 5. The wall penetration opening 145 is disposed in the housing opening 115 of the outer housing 5. The wall penetration opening 145 is disposed in the housing opening 115 of the outer housing 5 that is configured as a depression. The cooling air can flow from the housing opening 115 configured as a depression through the wall penetration opening 145 into the interior of the outer housing 5.

The tool plane E illustrated in FIG. 9 runs in a manner analogous to that described in the context of the embodiment according to FIG. 3. The tool plane E possesses a first side 46 illustrated in FIG. 3. The tool plane E possesses a second side 47. The tool plane E separates the first side 46 from the second side 47. The air filter 12 is disposed completely on the first side 46 of the tool plane E. The work apparatus 1 in FIG. 9 is illustrated in a view onto the first side 46 of the tool plane E.

As is illustrated in FIG. 10, the housing opening 115 configured as a depression, in the lateral view in the direction perpendicular onto the first side 46 of the tool plane E, and with the filter 12 removed, is larger than the wall penetration opening 145, in particular than the area of the wall penetration opening 145.

As is illustrated in FIG. 9, the housing opening 15 in an imaginary projection onto the tool plane E in the direction perpendicular to the tool plane E possesses the opening outer contour 28. The opening outer contour 28 delimits the imaginary opening area 29. The opening area 29 extends in the tool plane E. The opening area 29 and the filter surface 39 are schematically plotted with the same dashed line in FIG. 9. The filter surface 39 is a surface which is delimited by the outer contour of the projection of the filter 12 into the tool plane E, as has been described in the context of FIGS. 1 to 8.

The opening area 29, in particular the filter surface 39, is at least 60 cm$^2$, in particular at least 70 cm$^2$, in particular at least 80 cm$^2$, in particular at least 85 cm$^2$, in particular at least 100 cm$^2$, in particular at least 125 cm$^2$, in the embodiment at most 100 cm$^2$, in particular at most 90 cm$^2$. The areas/surfaces are measured in the projection into the tool plane E. These areas/surfaces are measured in particular in the lateral view perpendicular onto the tool plane E.

The wall penetration opening 145 illustrated in FIGS. 10 to 12 has an actual penetration area. In particular, the actual penetration area is a curved area, in particular in the mathematical sense. The actual penetration area corresponds to the integrated area of the wall penetration opening 145. The actual penetration area is expediently smaller than the opening area 29 projected onto the tool plane E, in particular than the filter surface 39.

The penetration area is smaller than the filter surface 39, in particular than the opening area 29.

In particular, the actual penetration area is at most 40%, in particular at most 30%, in particular at most 20%, in particular at most 10%, in particular at most 6%, of the opening area 29 projected onto the tool plane E, in particular of the filter surface 39 projected onto the tool plane E.

In particular, the actual penetration area is at least 1%, in particular at least 3%, in particular at least 5%, in particular at least 10%, of the opening area 29 projected onto the tool plane E, in particular of the filter surface 39 projected onto the tool plane E.

In particular, the actual penetration area is at least 200 mm$^2$, in particular at least 300 mm$^2$, in particular at least 400 mm$^2$.

In particular, the actual penetration area is at most 1200 mm$^2$, in particular at most 800 mm$^2$, in particular at most 600 mm$^2$.

In particular, the opening area 29 projected onto the tool plane E, in particular the filter surface 39 projected onto the tool plane E, is at least 60 cm$^2$, in particular at least 80 cm$^2$.

In particular, the opening area 29 projected onto the tool plane E, in particular the filter surface 39 projected onto the tool plane E, is at most 100 cm$^2$, in particular at most 90 cm$^2$.

Cooling air can be inducted into a housing interior 139 of the outer housing 5 through the wall penetration opening 145. Cooling air can advance into the housing interior 139 of the outer housing 5 through the wall penetration opening 145. The depression which is formed by the housing opening 115 is disposed, in particular in functional terms, in particular in terms of the path of the cooling air along the cooling air path 26, between the air filter 12 and the wall penetration opening 145. The cooling air path 26 is illustrated by dashed lines in FIG. 11 in the region outside the housing interior 139. In the region within the housing interior 139, the cooling air path 26 is illustrated by a dotted line. In the region of the depression formed by the housing opening 115, the cooling air is located outside the housing interior 139. The cooling air enters the housing interior 139 of the outer housing 5 only when the cooling air passes through the wall penetration opening 145. The motor 7 and a fan not illustrated, in particular an impeller not illustrated, are disposed in the housing interior 139.

The air filter 12 covers the housing opening 115 configured as a depression, as well as the wall penetration opening 145.

The cooling air is filtered between the air filter 12 and the wall penetration opening 145. The region along the flow path 26, plotted with dotted lines in FIG. 11, downstream of the air filter 12 is referred to as the clean air space 114. The housing opening 15 configured as a depression in the outer housing 5 is part of the clean air space 114.

The housing opening 15 configured as a depression in the outer housing 5 delimits the flow path 26 in a funnel-shaped manner in the region between the air filter 12 and the wall penetration opening 145. After the cooling air has been filtered by the air filter 12, the effective flow cross section is reduced along the flow path 26. The flow cross section for the cooling air on the way from the air filter 12 to the wall penetration opening 145 is reduced to less than 30%, in particular to less than 20%, in particular to less than 10%, in particular to less than 6%, in particular to more than 2%, in particular to more than 4% of the flow cross section when passing through the air filter 12, in particular the opening area 29, in particular the filter surface 39.

In the embodiment according to FIGS. 9 to 12, the air filter 12 is a constituent part of an outer surface of the work apparatus 1. The air filter 12 forms part of the outside of the work apparatus 1. The air filter 12 is a continuation of the first lateral surface 21 of the outer housing 5, in particular in the region of the housing opening 115 configured as a depression. In this embodiment, the cooling air initially enters the work apparatus 1 through the air filter 12. Subsequently, the flow cross section for the cooling air is reduced on the way to the wall penetration opening 145. The housing opening 15 configured as a depression serves as a funnel in the process. As a result of the initially large flow cross section, the cooling air is efficiently filtered by the air filter 12. The flow velocity of the cooling air is significantly increased by virtue of the reduction of the flow cross section up to the wall penetration opening 145. A good cooling effect can be achieved with the cooling air in the housing interior 139 as a result.

It is understood that the foregoing description is that of the preferred embodiments of the invention and that various changes and modifications may be made thereto without departing from the spirit and scope of the invention as defined in the appended claims.

The invention claimed is:

1. A chain saw or cutoff machine comprising:
a tool defining a tool plane;
an operator-controlled handle;
the chain saw or cutoff machine defining a longitudinal direction running in a direction from said operator-controlled handle to said tool;
an outer housing defining a housing opening for inducting cooling air into said outer housing;
an electric motor disposed in said outer housing and configured to drive said tool;
an air filter disposed on or in said housing opening;
wherein the chain saw or the cutoff machine in a resting position is configured to be placed on a horizontal plane;
said outer housing having a base which in said resting position faces the horizontal plane;
said outer housing having a housing cover which lies opposite said base;
said outer housing having a lateral surface which connects said housing cover and said base to one another and along the longitudinal direction delimits the chain saw or the cutoff machine in a direction perpendicular to said tool plane;
said air filter being disposed on said lateral surface of said outer housing;
said outer housing, in a lateral view perpendicularly onto said tool plane, having a housing outer contour which in an imaginary projection onto said tool plane in a direction perpendicular to said tool plane delimits an imaginary housing surface;
said air filter in an imaginary projection onto said tool plane in the direction perpendicular to said tool plane having a filter outer contour which delimits an imaginary filter surface; and,
said imaginary filter surface being at least 5% of said imaginary housing surface.

2. The chain saw or cutoff machine of claim 1, wherein said housing opening is disposed on said lateral surface of said outer housing; said housing opening in an imaginary projection onto said tool plane in the direction perpendicular to said tool plane has an opening outer contour which delimits an imaginary opening area; and, said imaginary opening area is at least 5% of said imaginary housing surface.

3. The chain saw or cutoff machine of claim 1, wherein said imaginary filter surface is at least 60 cm$^2$.

4. The chain saw or cutoff machine of claim 1, wherein an upward direction extends in a direction transverse to the longitudinal direction and in a direction parallel to said tool plane; said air filter is inclined in the upward direction in relation to said lateral surface of the chain saw or of the cutoff machine such that dirt can be released and fall out of said air filter due to gravity.

5. The chain saw or cutoff machine of claim 1, wherein said air filter is able to be fastened to the outer housing by a single fastening element.

6. The chain saw or cutoff machine of claim 1, wherein said outer housing has a receiving shaft for a rechargeable battery pack; the rechargeable battery pack is configured to be inserted in an insertion direction into said receiving shaft through a receiving opening of said receiving shaft; and, said lateral surface is free from said receiving opening.

7. The chain saw or cutoff machine of claim 6, wherein the insertion direction runs parallel to said tool plane.

8. The chain saw or cutoff machine of claim 6, wherein imaginary projections of said air filter and of said receiving shaft onto said tool plane in the direction perpendicular to said tool plane overlap in said tool plane.

9. The chain saw or cutoff machine of claim 1, wherein said air filter is a fine filter.

10. The chain saw or cutoff machine of claim 1, wherein said air filter has an actual surface; said actual surface is a curved surface; said actual surface corresponds to an integrated area of one side of a surface of said air filter; and, said actual surface is larger than the imaginary filter surface projected onto said tool plane.

11. The chain saw or cutoff machine of claim 10, wherein said actual surface of said air filter is at least 150 cm$^2$.

12. The chain saw or cutoff machine of claim 10, wherein said actual surface of said air filter is at least 8% of said imaginary housing surface projected onto said tool plane.

13. The chain saw or cutoff machine of claim 1, wherein said air filter forms part of an outside of the chain saw or cutoff machine; said housing opening is formed as a depression in the lateral surface such that a cavity is formed between an outside of the lateral surface and said air filter; and, a wall penetration opening which completely penetrates a wall of said outer housing is formed in said housing opening.

14. The chain saw or cutoff machine of claim 13, wherein said wall penetration opening possesses a penetration area; and, said penetration area is smaller than said imaginary filter surface.

15. The chain saw or cutoff machine of claim 14, wherein said penetration area is at most 30% of said imaginary filter surface.

16. The chain saw or cutoff machine of claim 14, wherein said penetration area is at most 1500 mm$^2$.

17. The chain saw or cutoff machine of claim 1, wherein the chain saw or the cutoff machine defines an inlet opening for inducting the cooling air into the chain saw or into the cutoff machine; said air filter is disposed exclusively on a first side of said tool plane; said inlet opening is disposed such that the cooling air is configured to flow in the longitudinal direction through said inlet opening; the chain saw or the cutoff machine in the lateral view perpendicular onto said first side of said tool plane within said housing outer contour is free from openings for the entry of the cooling air into the chain saw or into the cutoff machine across at least 95% of said imaginary housing surface.

* * * * *